Nov. 5, 1935.  D. T. BROWNLEE  2,019,476
TEMPERATURE CONTROLLING MEANS FOR INTERNAL COMBUSTION ENGINES
Filed Jan. 25, 1933   2 Sheets-Sheet 1

Inventor:
Dalmar T. Brownlee,
By Arthur Wm Nelson
Atty.

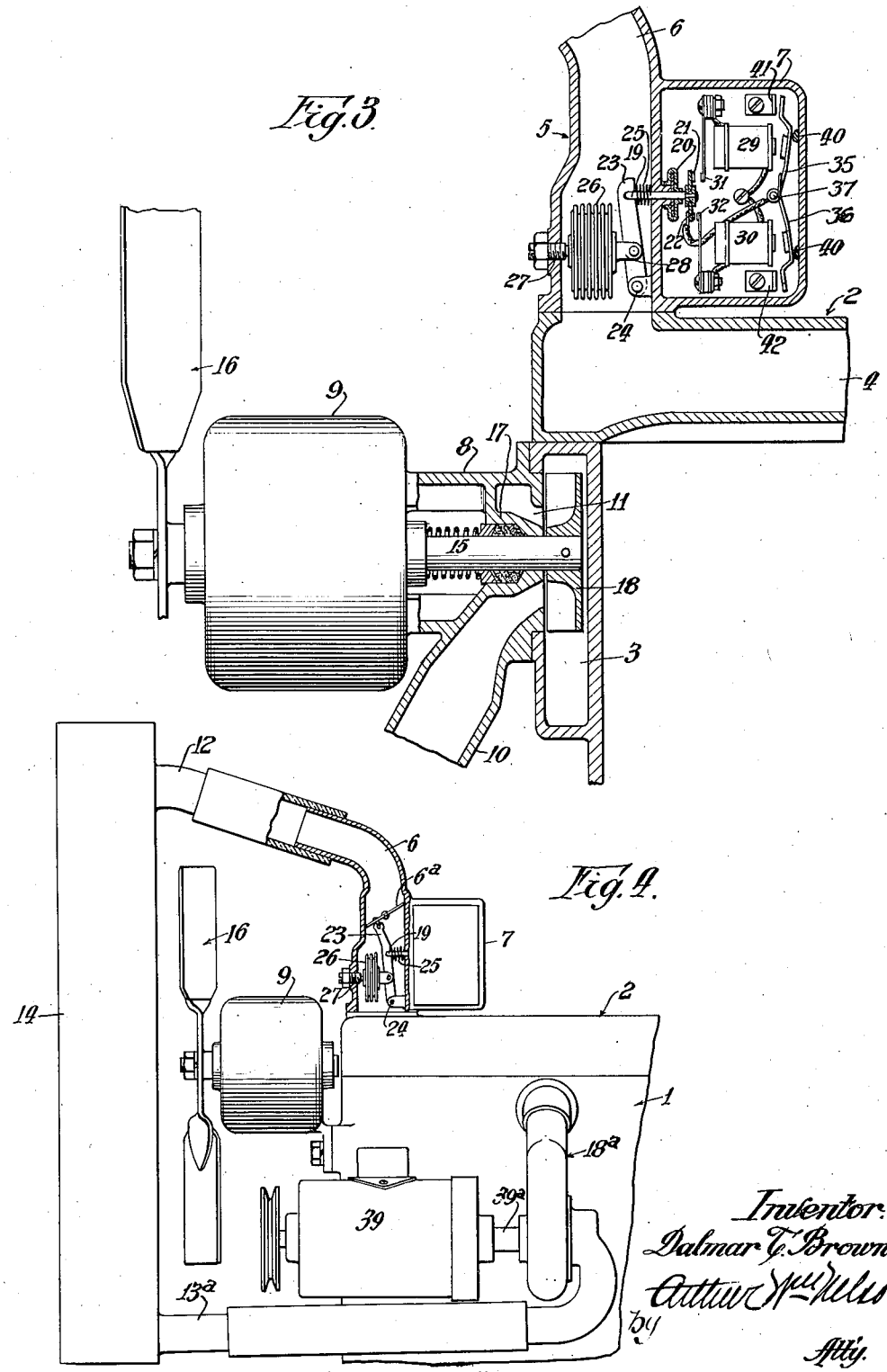

Patented Nov. 5, 1935

2,019,476

UNITED STATES PATENT OFFICE 2,019,476

TEMPERATURE CONTROLLING MEANS FOR INTERNAL COMBUSTION ENGINES

Dalmar T. Brownlee, Indianapolis, Ind., assignor, by mesne assignments, to William C. Starkey, Raymond S. Pruitt, and Walter H. Beal, trustees Application January 25, 1933, Serial No. 653,417

3 Claims. (Cl. 123—171)

This invention relates to improvements in temperature controlling means for internal combustion engines, and it consists of the matters hereinafter described and more particularly pointed out in the appended claims.

In the present automobile, the conventional practice is to drive the fan and water pump from the engine by means of belts so that the fan speed is always directly proportioned to the engine speed. To prevent the cooling water from boiling under any condition likely to be met in use, the fan is driven faster than crank shaft speed. It has been found that the power required to drive a fan from the engine, increases closely with the cube of the speed so that in some automobiles, at 70 M. P. H., with the engine turning over at 4000 R. P. M., the fan absorbs approximately 19 H. P. It is apparent that driving the fan from the engine at such high speed is wasteful of power and fuel.

One of the objects of the present invention is to provide a construction whereby the best operating temperature of an automobile or like internal combustion engine may be quickly secured and thereafter maintained regardless of varying conditions of speed, load and weather conditions.

A further object of the invention is to provide a construction which prevents driving the radiator cooling fan at such excessive speeds as entail heavy power losses and a useless consumption of fuel.

Another object of the invention is to prevent operation of the fan, or both the fan and water pump, when the engine is cold so that correct operating temperature for the engine is more quickly attained.

Again it is an object of the invention to provide means whereby the temperature of the engine cooling water may be quickly raised for use in heating up the body of the vehicle, very soon after starting.

It is also an object of the invention to provide means which relieves the engine starting motor from the work of driving the fan and pump when starting the engine.

Still another object of the invention is to provide an electrically driven fan with regulated speeds for cooling the radiator, thus eliminating the use of the engine driven belt which is subject to excessive speeds and to attendant slippage and also preventing fan bearing trouble.

The above mentioned objects of the invention, as well as others, together with the many advantages thereof, will more fully appear as I proceed with my specification.

In the drawings:

Fig. 3 is a longitudinal vertical sectional view on an enlarged scale of the parts shown in Fig. 1 and mounted on the associated engine; and Fig. 4 is a view similar to Fig 1 with parts shown as broken away and illustrates a slightly modified form of the invention.

Figure 1:
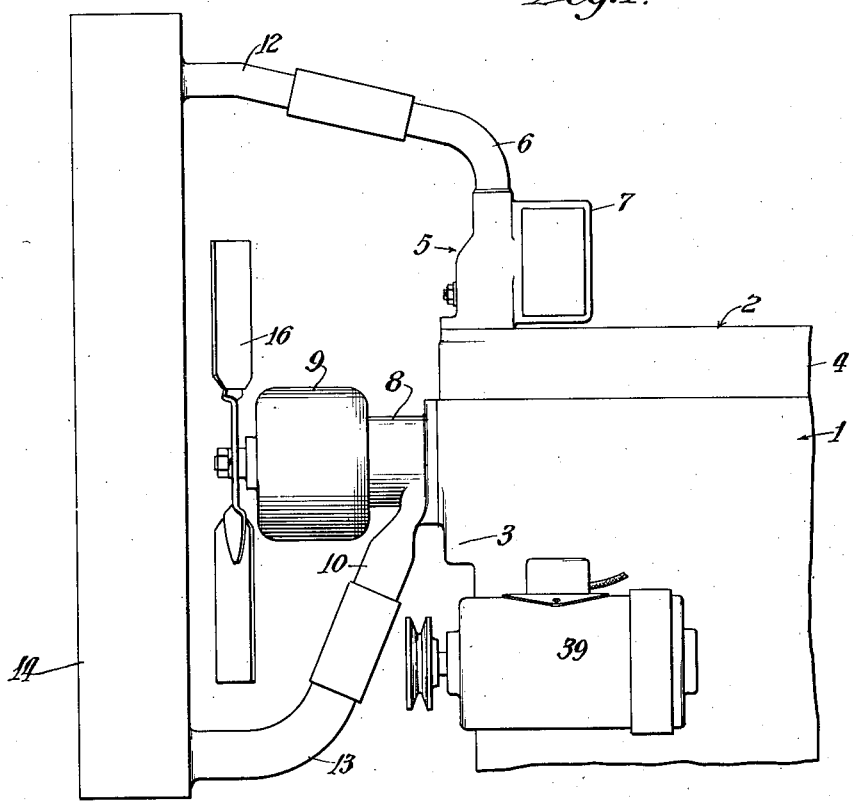
Fig. 1 is a view in side elevation of a portion of an automobile engine and parts forming the temperature control means or system therefor, embodying one form of the invention.
Figure 2:
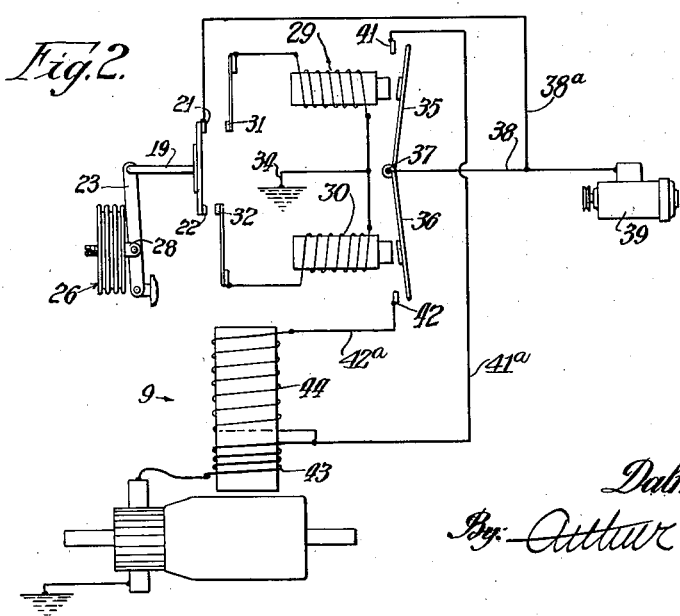
Fig. 2 is a diagrammatic view illustrating the electric circuit for the improved temperature control means.

Referring now in detail to that embodiment of the invention, illustrated in Figs. 1, 2 and 3 respectively, of the accompanying drawings:

1 indicates as a whole the cylinder block of a multicylinder automobile engine and 2 indicates as a whole, the cylinder head therefor. Both the block and head are provided with water jackets 3 and 4 respectively, which communicate with each other in the manner well known.

Rising from the top front end of the cylinder head is a tubular casting 5 which includes a water passageway 6 that communicates at its bottom end with the jacket 4 and to the rear of said passageway is provided a hollow chamber 7. Said chamber is provided with a door-closed opening in one side thereof, as shown in Fig. 1.

Mounted on the top front end of the cylinder block and projecting forwardly therefrom is a tubular support 8 for an electric motor 9. Extending downwardly from the bottom of said support is a tubular extension 10, which, by means of an annular opening 11, communicates with the jacket 3 of the cylinder block.

The water passageway 6 and tubular extension 10 are operatively connected by conduits 12 and 13 with the top and bottom respectively of an associated water cooling radiator 14 located in advance of the motor 9.

The motor 9 includes an armature shaft 15 and on the front end of said shaft to the rear of the radiator, is fixed a conventional type of fan 16. The rear end of said shaft extends through a packed bearing 17 in the tubular support 8 and to the extremity of said shaft end within the jacket 3 is secured a pump impeller, 18.

Slidably mounted in the rear wall of the casting 5 and extending through the same so as to open into the chamber 7 is a stem 19 and associated with said stem inside said chamber is a flexible rubber sealing sleeve 20. This sleeve is so constructed and arranged with respect to the stem 19 and associated parts as to permit of a sliding movement of the stem in both directions without a leakage of water from the passage 6 into the chamber 7. On that end of said stem within said chamber and suitably insulated therefrom are two contacts 21 and 22 respectively.

The front end of said stem, within the passage 6 is operatively connected with the top end of a lever 23 which is pivoted at its bottom end as at 24 to the inside of the rear wall of said passage. A spring 25 surrounds the stem 19 between said wall just above mentioned and the top end of said lever, and said spring normally urges said stem forwardly.

26 indicates a temperature responsive device or thermostat arranged in the bottom end of the passage 6. Said device as here shown is of bellows form and is adapted to expand and contract. It is mounted at its front end upon a screw stud 27, adjustably arranged in the front wall of the casting 5. The rear end of said device carries a stem 28 which is operatively connected to the lever 23 at a point between its ends.

In the chamber 7 are mounted electromagnets 29 and 30 respectively, with their axes arranged parallel with that of the stem 19 and arranged in planes above and below the same. 31 and 32 indicate fixed contacts in said chamber associated with and arranged in line with the contacts 21 and 22 on the stem 19. It is pointed out that the spacing between the contacts 31—21 is somewhat greater than the spacing between the contacts 32—22 and the purpose of this difference in spacing will later appear.

The contacts 31—32 are connected respectively to the windings of the electromagnets 29 and 30 and both windings are suitably grounded as at 34. Associated with said electromagnets are armatures 35 and 36 respectively, both pivoted on a common axis 37 arranged in the plane of the stem 19. The armatures are both connected by a conductor 38 to a suitable source of current supply such as an engine driven generator 39 and said conductor is provided with a branch 38ª which leads to the contacts 21—22 carried by the stem 19.

On the rear wall of the chamber 7 are insulating stops 40 for the armatures 35 and 36 and associated with said armatures are fixed contacts 41—42 respectively.

The motor 9 is a series wound motor having a field with double windings 43—44 respectively, as best shown in Fig. 2. The winding 44 consists of a relatively large number of turns of comparatively fine wire and thereby has considerable resistance while the winding 43 is serially connected with respect to the winding 44 and consists of a relatively small number of turns of comparatively coarse or heavy wire and therefore has a lesser resistance. The fixed contact 42 is connected by a conductor 42ª to the field winding 44, and the contact 41 is connected by a conductor 41ª to the field winding 43.

When the engine is cold, the thermostat is in its contracted condition and the contacts 21, 31, 22 and 32 are open so that no current passes to the motor 9. When starting the engine, as the motor 9 is not energized, there is no circulation of cooling water through the circulatory system as provided by the jackets, radiator and conduits mentioned so that the water will quickly warm up.

So soon as warm water reaches the thermostat, said thermostat will start to expand and through the lever 23 will exert an endwise push on the stem 19 against the action of the spring 25. In this movement of the stem, the contact 22 will engage its associated contact 32 and this will result in completion of the following circuit whereby the electromagnet 30 is energized: generator 39; branch conductor 38ª; contacts 22 and 32; magnet 30 and the ground 34.

When said magnet is so energized it will attract the associated armature 36 which will then engage the contact 42 and a small current will flow first through the field winding 44 of the motor and then through the field winding 43. The current is small on account of the two windings 43, 44 being in series and the high resistance of winding 44. When the magnet 30 is energized current flows to the motor 9 by way of the following circuit: Generator 39; conductor 38; armature 36; contact 42; conductor 42ª; field winding 44; field winding 43. With the motor thus energized, it operates to drive the fan and pump at a relatively low speed and this causes a circulation of air through the radiator and a circulation of water from the jacket 3 to the jacket 4. From said last mentioned jacket, water passes into the passage 6 and conduit 12 to the top of the radiator, through the same, out of the bottom through the conduit 13 back to the jacket 3 again. With the motor running in this low speed range the water circulation will be relatively slow.

Under certain conditions, the engine may continue to run with a relatively slow circulation of water and air. If, however, the temperature of the cooling water increases sufficiently, the thermostat 26 will further expand and the contact 21 will engage the contact 31 thus energizing the electromagnet 29. The circuit for the magnet is as follows: Generator 39; branch conductor 38ª; contact 21; contact 31; magnet 29; and ground 34. When the magnet 29 is energized; the armature 35 is attracted so that it engages the contact 41. This results in current flowing directly from the generator to the low resistance winding 43 by way of the conductor 41ª. Because the winding 43 is a low resistance winding a much heavier current flows to the motor and the latter rotates at an increased speed. Whereas the winding 44 is also in the circuit, little if any current flows to it due to the fact that it is of high resistance and the current shunts around it and flows directly to the winding 43. With a greater current flow to the motor a greater torque in the armature of the motor is created, so that the motor will drive the fan and pump at a higher speed and more air will be caused to flow through the radiator and the water circulation will be speeded up in proportion.

Should the increased air and water circulation cool the water sufficiently, the contacts 21—31 will disengage but the contacts 22—32 will remain engaged and the motor will drop back to its slower speed with a resulting drop in air and water circulation. Should a further drop in cooling water temperature occur the contacts 22—32 will open and the motor thus being cut off from its source of current supply will cease to run. With this arrangement the air movement or flow and water circulation are approximately in proportion to the temperature of the water. Again, with such an arrangement as no valves are employed in the water circulating system there will be a slight thermosiphonic water circulation before the fan and pump start operating and which slight circulation is desirable.

In Fig. 4 is illustrated a modified form of construction. In this construction instead of mounting the pump impeller upon the armature shaft of the motor 9, I mount a pump 18a on the side of the cylinder block 1 or other suitable place and drive it from the shaft 39a of the generator 39 which as before, is engine driven. As shown in Fig. 4, the inlet side of said pump is connected by a conduit 13a with the bottom of the radiator.

With such an arrangement, I provide a pivoted valve disc 6a in the water passage 6 and connect the same up with the lever 23. When the engine starts the pump is driven but no water circulates through the system due to the fact that the valve 6a in the passage 6 is in its closed position. However, so soon as the water warms up, the thermostat 26 through the lever 23, will open the valve 6a and will cause engagement of the contacts 22—32 to start the motor and fan to rotate at the lower speed.

Upon further heating of the water, the thermostat will expand to a greater extent and will more fully open the valve 6a and then cause engagement of the contacts 21—31 so that the motor and fan run at the higher speed. Of course, when the water cools down, the thermostat will contract to reduce the speed of the motor and move the valve 6a toward its closed position.

It is apparent that with the arrangement described, the engine may be kept at the correct operating temperature regardless of varying conditions of speed, load and weather conditions. Thus when no circulation is required, no parts are being uselessly driven to consume power and therefore, the engine will more quickly warm up to the proper operating temperature.

With the construction described, the cooling water does not attain that high temperature which boils out and evaporates any volatile anti-freeze, liquids or fluids that may be used with said cooling water.

While in describing the invention, I have referred in detail to the form, arrangement and construction of the various parts thereof, the same is to be considered in an illustrative sense only, so that I do not wish to be limited thereto except as may be specifically set forth in the appended claims.

I claim as my invention:

1. In combination, an internal combustion engine having a water jacket, a radiator, means connecting said water jacket and radiator to provide a water circulatory system, a fan for flowing air through the radiator for water cooling purposes, a series wound electric motor connected to drive the fan and having a low speed field winding and a high speed field winding, current supply means, a first switch controlled means forming a circuit between the current supply means and the low speed field winding, a second switch controlled means forming a circuit between said current supply means and the high speed winding, and a device responsive to temperature variations of the water in the circulatory system operable when the temperature of the water reaches a predetermined point to close the switch of the first circuit forming means and when the temperature increases beyond said point to another predetermined point to close the switch of the second circuit forming means.

2. In combination, an internal combustion engine having a water jacket, a radiator, means connecting said water jacket and radiator to provide a water circulatory system, a fan for flowing air through the radiator for water cooling purposes, a series wound electric motor connected to drive the fan and having a high speed field winding and a low speed field winding including the first mentioned winding, current supply means, a first switch controlled means forming a circuit between the current supply means and the low speed field winding, a second switch controlled means forming a circuit between said current supply means and the high speed field winding, and a device responsive to temperature variations in the water circulatory system operable when the temperature of the water reaches a determined point to close the switch of the first circuit forming means, and when the temperature increases beyond said point to another predetermined point to close the switch of the second circuit forming means.

3. In combination, an internal combustion engine having a water jacket, a radiator, means connecting said water jacket and radiator to provide a water circulatory system, a fan for flowing air through the radiator for water cooling purposes, a series wound electric motor connected to drive the fan and wound so that it has a high resistance portion and a low resistance portion, a water pump arranged in a part of said circulatory system and connected for drive by said motor, current supply means, a first switch controlled means adapted upon closing of the switch thereof to form a circuit including the current supply means and the high resistance portion of the motor winding whereby the motor is driven at low speed, a second switch controlled means adapted upon closing of its switch to form a circuit including the current supply means and the low resistance portion of the motor winding whereby the motor is driven at high speed, and a device responsive to temperature variations of the water in the circulatory system operable when the temperature of the water reaches a predetermined point to close the switch of the first circuit forming means and when the temperature increases beyond said point to another predetermined point to close the switch of the second circuit forming means.

DALMAR T. BROWNLEE.